United States Patent
Kodimer

(10) Patent No.: US 10,362,183 B2
(45) Date of Patent: Jul. 23, 2019

(54) SYSTEM AND METHOD FOR NATURAL LANGUAGE OPERATION OF MULTIFUNCTION PERIPHERALS

(71) Applicant: Toshiba TEC Kabushiki Kaisha, Higashigotanda, Shinagawa-ku (JP)

(72) Inventor: Marianne Kodimer, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/119,165

(22) Filed: Aug. 31, 2018

(65) Prior Publication Data

US 2019/0149675 A1 May 16, 2019

Related U.S. Application Data

(60) Provisional application No. 62/584,475, filed on Nov. 10, 2017.

(51) Int. Cl.
| | | |
|---|---|---|
| *H04N 1/00* | (2006.01) | |
| *G10L 15/22* | (2006.01) | |
| *G10L 15/18* | (2013.01) | |
| *G06F 3/16* | (2006.01) | |

(52) U.S. Cl.
CPC ......... *H04N 1/00403* (2013.01); *G06F 3/167* (2013.01); *G10L 15/1815* (2013.01); *G10L 15/22* (2013.01); *H04N 1/00281* (2013.01); *H04N 1/00411* (2013.01); *G10L 2015/223* (2013.01); *H04N 2201/0094* (2013.01)

(58) Field of Classification Search
CPC .......... H04N 1/00403; H04N 1/00411; H04N 1/00281; H04N 2201/0094; G10L 15/22; G10L 15/1815; G10L 2015/223; G06F 3/167

USPC ....................................................... 358/1.13
See application file for complete search history.

(56) References Cited

U.S. PATENT DOCUMENTS

| | | | | |
|---|---|---|---|---|
| 2008/0192289 | A1* | 8/2008 | Honda .................. | G06F 21/608 358/1.15 |
| 2009/0091786 | A1* | 4/2009 | Yamaguchi ........ | H04N 1/00222 358/1.15 |
| 2017/0264765 | A1* | 9/2017 | Nobutani ............. | H04N 1/4413 |

OTHER PUBLICATIONS

Vilella, Josep; Extended European Search Report, including European Search Report and European Search Opinion, Patent Application No. EP 18204413; dated Mar. 4, 2019; 11 pages.

* cited by examiner

*Primary Examiner* — Allen H Nguyen
(74) *Attorney, Agent, or Firm* — Ulmer & Berne LLP

(57) ABSTRACT

A system and method for natural language-based multifunction peripheral control includes sensing when a portable data device is proximate to a MFP. A status of the MFP is monitored and user-specific configuration information is stored. The system receives activity data corresponding to performance of a preselected activity by a user and initiates a natural language exchange with a user of the portable data device in accordance with a monitored status of the multifunction peripheral and stored user-specific configuration settings. Document processing instructions received via the natural language exchange generate a natural language response. A second document processing instruction is then received via the natural language exchange responsive to the natural language response and a document processing operation is performed in accordance with the second document processing instruction.

4 Claims, 14 Drawing Sheets

| | Operator | Conversation workflow | Alternate keyboards | Preconditions |
|---|---|---|---|---|
| 1 |  | Hello <Username> Would you like to make a copy? | | User is logged into app and User Name is known |
| 2 |  | Yes | Yes<br>Make a Copy<br>Make two copies<br>Make two stapled copies | |
| 3 |  | How many copies do you need? | | |
| 4 |  | two | <1-5> | |
| 5 |  | Would you like your copies to be stapled? | | |
| 6 |  | Yes<br>--<br>No | Yes<br>Yes Staple<br>Yes Please<br>OK<br>Sure<br>---<br>No<br>No thanks<br>That's all<br>Done. | |
| 7 |  | Okay I'll make 2 stapled copies of your document, is that correct? | | |
| 8 |  | Yes<br>--<br>No | Yes<br>Correct<br>OK<br>Finished.<br>---<br>No (then go back to #3) | |

FIG. 12

| Conversation | Trigger Terms |
|---|---|
| Would you like to make a copy? | |
| Yes | Please Make a Copy<br>...Copy... |
| How many copies? | |
| two | One...five |
| One sided or two? | |
| two | One \| Two<br>Duplex<br>simplex |
| Do you want the copy stapled? | |
| Yes | Yes \| No |
| Okay you want two copies two sided and stapled is that correct? | |
| Yes | Yes \| No |
| Copying... | |
| Your job is finished, don't forget to pick up your originals | |

YES Confirmation

| Conversation | Acceptable Alternative Terms |
|---|---|
| Would you like to make a copy? | |
| Please make a copy | ...Copy... |
| How many copies? | |
| two | One' five |
| One sided or two? | |
| two | One \| Two |
| Yes | Yes \| No |
| Okay you want two copies two sided and stapled is that correct? | |
| No | Yes \| No |
| Then What would you like? | |

NO Confirmation

FIG. 13

|  | KeyWord Search Term | |
|---|---|---|
| Command | English | Japanese |
| copy | copy, copies, duplicate | コピー、複数のコピー、複写 |
| 1-sided | simplex, one side, one-side, one sided, single side, single sided | シンプレックス、片面、ワンサイド、1面、 |
| 2-sided | duplex, two side, two-side, two sided, two sides, two-sided, double side, double-sided | デュプレックス、両面、二面 |
| staple | staple | ステイプル |
| 1 | a, single, one, duplicate | 一つ、一つの、単一、単一の、複写、複製、 |
| 2 | double, two, twice | ダブル、二倍、倍、二（に）、二度、二回、 |
| 3 | three | 三（さん） |
| 4 | four | 四（よん） |
| 5 | five | 五（ご） |
| 6 | six | 六（ろく） |
| 7 | seven | 七（しち） |
| 8 | eight | 八（はち） |
| 9 | nine | 九（きゅう） |
| 10 | ten | 十（じゅう） |
| yes | yes, yeah, yup, true, correct, sure | はい、イエイ、そうね、そうです、正しいです、間違いないです、確かです |

Example prompts and confirmations can include:

| | |
|---|---|
| Would you like to make a copy? | |
| Then what would you like? | |
| Sorry I didn't catch that. Can you please repeat your request? | もう一度、くりかえしてください。 |
| You want to make 1 copy 2-sided without staple. Is that correct? | ステイプルなし両面コピーを一部でよろしいですか？ |
| You want to make 1 copy 1-sided with staple. Is that correct? | ステイプル付き片面コピーを一部でよろしいですか？ |
| You want to make 1 copy 1-sided without staple. Is that correct? | ステイプルなし片面コピーを一部でよろしいですか？ |
| Okay, your job is finished. Don't forget to pick up your originals. | ご依頼の仕事が終わりました。原稿をお忘れなくお持ちください。 |

FIG. 14

SYSTEM AND METHOD FOR NATURAL LANGUAGE OPERATION OF MULTIFUNCTION PERIPHERALS

CROSS-REFERENCE TO RELATED APPLICATIONS

This application claims the benefit of U.S. Provisional Application No. 62/584,475 filed Nov. 10, 2017, which is incorporated herein by reference.

TECHNICAL FIELD

This application relates generally to voice assisted control of document processing device operation. The application relates more particularly to a natural language dialog between a user and a multifunction peripheral using a portable data device, such as a smartphone, as a verbal or touchscreen interface.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Currently most MFP or other office devices are driven by a user interface such as a touch panel or button panel. In an effort to be more compliant with disabilities acts, some devices have become more sensitive to other communities by offering voice assisted user interfaces. However, this solution is expensive in terms of development and deployment and is not easily customized or tailored to an individual user's preferences.

BRIEF DESCRIPTION OF THE DRAWINGS

Various embodiments will become better understood with regard to the following description, appended claims and accompanying drawings wherein:

FIG. 12 is an example embodiment of a device/user interaction scenario;

FIG. 13 is another example embodiment of a device/user interaction scenario; and FIG. 14 is an example embodiment of keywords for device/user interaction scenarios.

DETAILED DESCRIPTION

Figure 1:
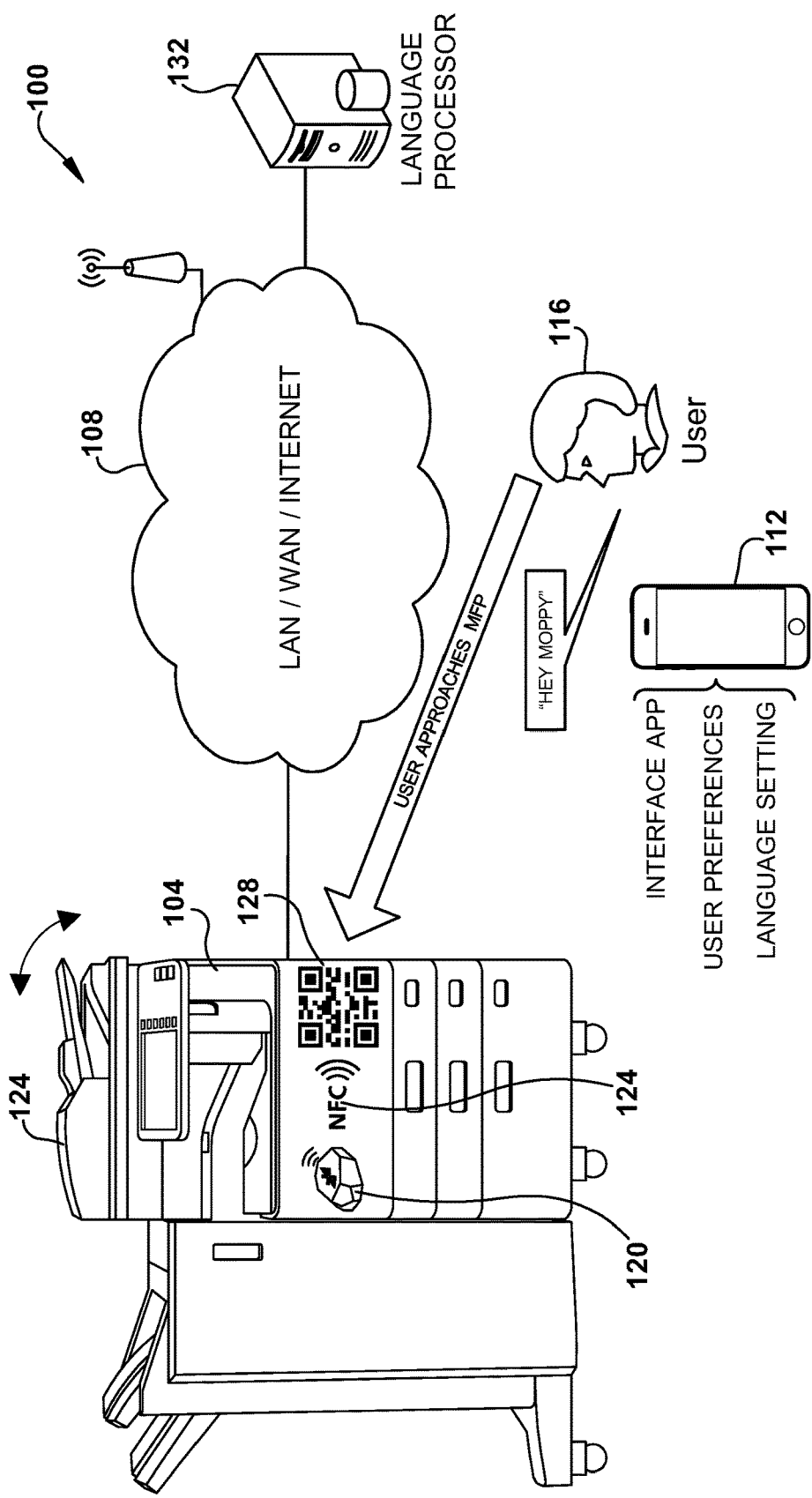
FIG. 1 an example embodiment of a natural language document processing operation system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In an example embodiment disclosed herein as system and method for natural language-based multifunction peripheral control includes sensing when a portable data device is proximate to an MFP. A status of the MFP is monitored and user-specific configuration information is stored. The system receives activity data corresponding to performance of a preselected activity by a user and initiates a natural language exchange with a user of the portable data device in accordance with a monitored status of the multifunction peripheral and stored user-specific configuration settings. Document processing instructions received via the natural language exchange generate a natural langue response. A second document processing instruction is then received via the natural language exchange responsive to the natural language response and a document processing operation is performed in accordance with the second document processing instruction.

Currently most MFP or other office devices are driven by a user interface such as a touch panel or button panel. In an effort to be more compliant with section 508 of the Rehabilitation Act and promote ease of use for people with (or without) disabilities, many devices offer voice assisted User Interfaces. Successful implementation can difficult and costly and may not be compatible with devices currently in the field. As will be detailed further below, the subject application includes example embodiments wherein a mobile data device, such as a smartphone, tablet computer notebook computer, smart watch or the like is used to communicate wirelessly with an office device such as MFP (via Bluetooth, NFC, Wi-Fi, etc.) to provide the user with a natural language user interface to accomplish device tasks. The provided voice input and voice response makes use of natural language, a menu driven "wizard" intelligent system, stored user preferences, and responses to both voice and physical inputs including recognition of paper in the paper tray to initiate a task. Provisioning of a mobile device application ("app") that can translate device capabilities into a series of natural language prompts and similarly translate user responses into computer commands understood by the MFP, creates a more accessible user interface for interacting with MFP devices. As used herein, natural language dialog includes any suitable device-user language communication, such as with both user and device speaking, with the user speaking and the device replying in characters, the user supplying character input and the device speaking, or both the user and the device communicating via characters. Responses may also be suitably supplied by users by device interaction, such as tapping a "yes" or "no" button displayed on a touchscreen or pressing one or more keys on an MFP or its display.

The system can include a mobile app that communicates with an office device such as MFP to provide the user with a natural language voice interaction user interface to accomplish tasks, physical prompts or menu driven selections.

The user interface and accompanying software recognize voice input and respond with voice menu commands, including:
English commands
Japanese or other foreign language commands
Provision of visual feedback on the MFP or device including:
Communicating questions
Listening
User response options
Translating users' voice to text
Device response and confirmation Example embodiments herein describe an application and a system that interacts with a hardware device such as an MFP to provide users with a natural language user interface. The MFP app is opened or initiated when the user enters a proximity threshold, as defined by a beacon, or when it is invoked by the user via touch or voice activation.

Wireless communication is established between the app and MFP either optically or via radio frequency by either proximity, user preferences, barcode, Wi-Fi, Wi-Fi direct, QR code scan, or NFC, or the like. Once communication is established, user preferences and historical information is retrieved from the app; the app also queries the device for device capabilities.

Task invocation is suitably initiated either automatically by placing paper in an automatic document feeder, or on the glass, or by initiating a conversation, for example "Hey Moppy."

A series of voice prompts are sent from the app to user and responses are collected by the device to configure an MFP task. A wizard-like approach is used in that subsequent prompts sent to the user are based on previous responses in an attempt to efficiently communicate to acquire job details. The user's language is translated to computer commands understood by the device. Once the job is configured on the app, it is sent to the device for processing.

An example mobile application comprises a client app executing on a mobile device (for example iOS). The mobile app uses natural language to convert voice commands to copy MFP commands to initiate MFP Copy Tasks or other tasks such as Copy, Print Release, Scan to email and other functions.

Embodiments herein include two basic systems.
A client side mobile app.
The client side mobile app listens to the user's voice, translates text locally, shows the conversation on the UI, or user interface, and sends the text to the server.
Client side can use iOS Siri or any other suitable voice recognition.
Running on the MFP is a background app.
The app resides on the MFP and receives the text strings from the client app. The app parses the text and converts the text to print commands.

A dictionary resides on the app server (HTTP Rest Server) that allows natural communication by accepting a variety of phrases for a copy command. For example, both terms "duplex" and "2-sided" can be recognized as a copy command for printing on both sides of the page.

A registered user can login to the MFP from the app that is optionally fingerprint enabled. This would allow the user to interact with devices with authentication required, allow any user preferences to be transferred to the job itself, and allow the user to release held print jobs using natural language.

FIG. 1 illustrates an example embodiment of a natural language operated system 100 including one or more MFPs, such as MFP 104. MFP 104 is suitably connected to network 108 by any suitable wired or wireless data path. Network 108 is suitably comprised of a local area network (LAN), wide area network (WAN), which may comprise the Internet, or any suitable combination thereof. MFP is suitably provided with an ability for wireless communication with portable data devices such as smartphone 112. Communication is suitably via Wi-Fi, including Wi-Fi direct, via near field communication (NFC), Bluetooth, or the like.

User 116 in possession of smartphone 112 approaches MFP 104. Proximity determined by any suitable means, including from Bluetooth beacon 120, NFC interface 124, or by detection of a marking on MFP 104, such as QR code 128. Smartphone 112 is running an interface app, and stores the user's document processing preferences and preferred language. When a user 116 is sufficiently proximate, they may initiate a natural language communication setting between MFP 104 and smartphone 112 by matching a preset pattern. Initiation is suitably triggered by distance, or by mechanical interaction of the user 116, such as pressing on their smartphone 112 touchscreen or MFP 104 user interface. Other mechanical interactions that may trigger a session include open a document feeder 124 on MFP 104 as indicated or by placing a document on a scanner platen. Initiation is also suitably commenced by uttering a wakeup phrase to smartphone 112 while running the app including a feature to listen continuously for such a phrase while running, including running in the background of other concurrent apps. Natural language input is suitably converted to text via a processor on MFP 104, a processor on smartphone 112, or a combination thereof. Processing and text-to-speech conversion is also suitably done by a networked language processor 132, suitably operable to receive a digital voice file and return a corresponding text file, thus eliminating dedicated hardware or software to provide such conversion. Document processing operations are then completed by a natural language dialog as will be detailed further below.

Figure 2:
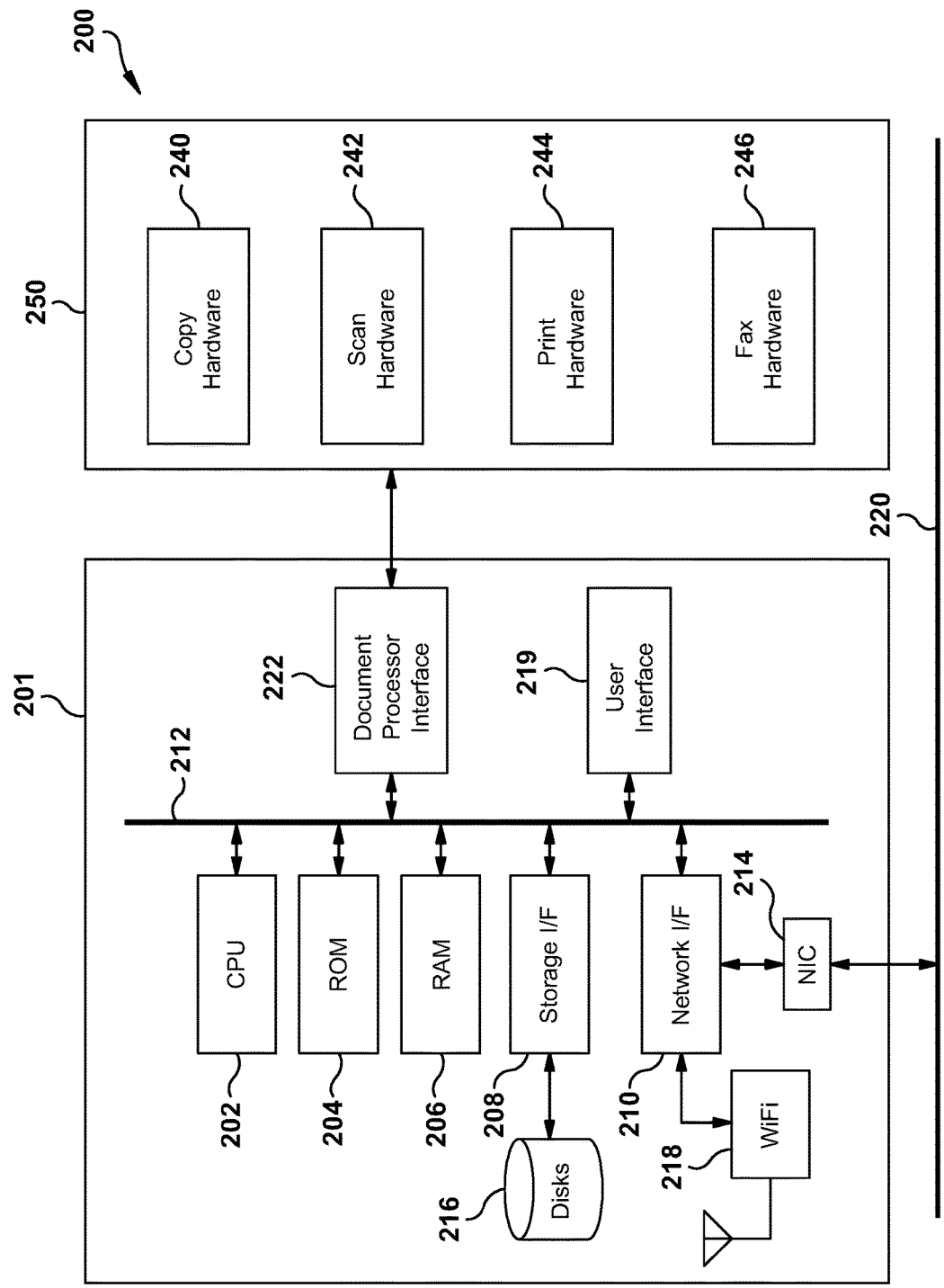
FIG. 2 is an example embodiment of a document processing device.

Turning now to FIG. 2 illustrated is an example embodiment of a MFP device comprised of a document rendering system 200 suitably comprised within an MFP, such as with MFP 104 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with one or more sensors which provide data relative to a state of the device or associated surroundings, such as device temperature, ambient temperature, humidity, device movement and the like.

Processor 202 can also be in data communication with any suitable user input/output (I/O) interface 219 which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
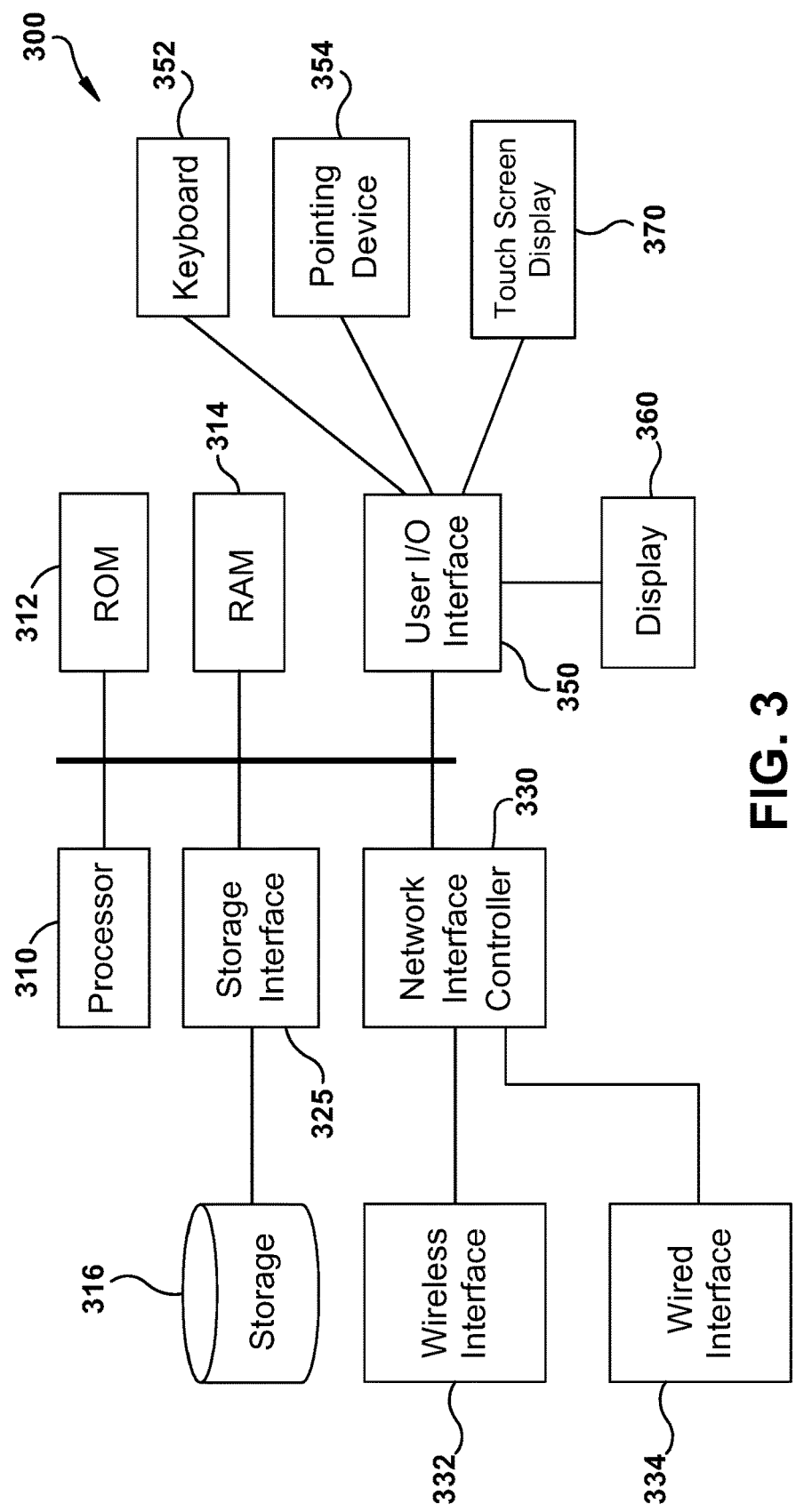
FIG. 3 is an example embodiment of a portable digital device.

Turning now to FIG. 3, illustrated is an example embodiment of a suitable portable digital device 300 such a smartphone 112 of FIG. 1. Included are one or more processors, such as that illustrated by processor 310. Each processor is suitably associated with non-volatile memory, such as read only memory (ROM) 312 and random access memory (RAM) 314, via a data bus 318.

Processor 310 is also in data communication with a storage interface 325 for reading or writing to a data storage system 316, suitably comprised of a hard disk, optical disk, solid-state disk, or any other suitable data storage as will be appreciated by one of ordinary skill in the art.

Processor 310 is also in data communication with a network interface controller (NIC) 330, which provides a data path to any suitable wired or physical network connection via physical network interface 334, or to any suitable wireless data connection via wireless interface 332, such as one or more of the networks detailed above. The system suitably uses location based services. By way of example, if multiple error event management systems are used, it may be advantageous to have monitoring of devices completed by a local or more proximate event management system.

Processor 310 is also in data communication with a user input/output (I/O) interface 350 which provides data communication with user peripherals, such as display 360, as well as keyboards 352, mice, track balls, or other pointing devices 354, touch screen 370, or the like. It will be understood that functional units are suitably comprised of intelligent units, including any suitable hardware or software platform.

Figure 4:
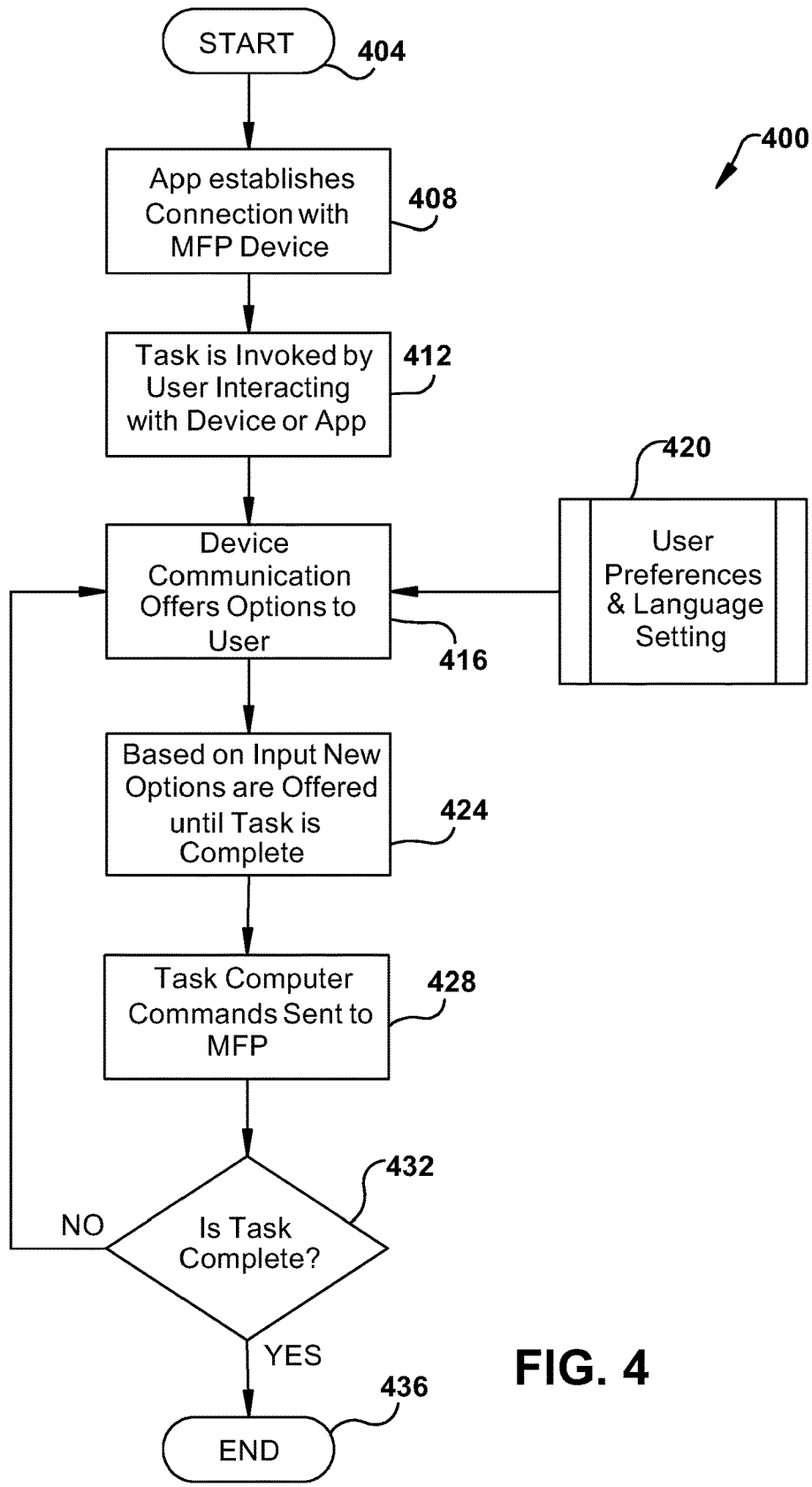
FIG. 4 is an example embodiment of voice assisted document processing operations.

FIG. 4 is a flowchart 400 of an example embodiment of voice assisted document processing operations. The process commences at block 404, and proceeds to block 408 when an app, such as a smartphone app, establishes connection with an MFP. The user interacts with a device or app at block 412 to invoke a document processing task. Device communication options between the MFP and smartphone are selectable by the user at block 416. As noted above, any suitable wireless protocol can be used, examples for communication included Wi-Fi, Bluetooth, NFC, optical, cellular, and the like. A communication session is suitably accomplished in accordance with preselected user preferences and language settings from block 420.

A natural language dialog is engaged at block 424, with back-and-forth communication as needed to set the user's desired document processing operation. Appropriate commands are sent to the MFP at block 428. If the task is determined to be complete at block 432, the process suitably ends. If not, the process returns to block 416.

Figure 5:
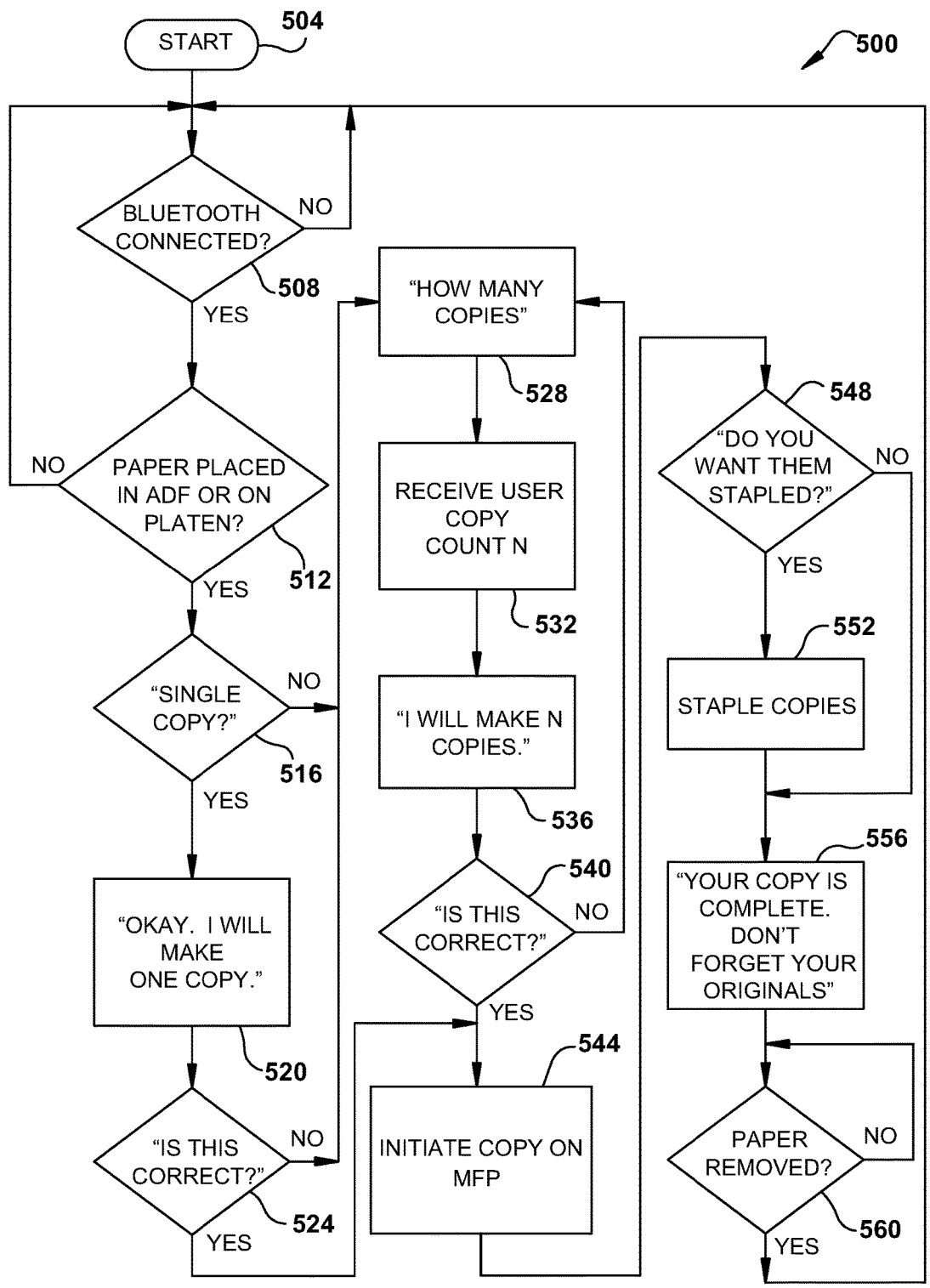
FIG. 5 is an example embodiment of a natural language dialog control of a document processing operation.

FIG. 5 is a flowchart 500 of an example embodiment of a natural language dialog control of a document processing operation. The process commences at block 504 and proceeds to block 508 until a Bluetooth connection is made. If so, a determination is made at block 512 as to whether a document has been loaded into an MFP's automated document feeder or placed on its platen for copying. If so, the user is determined to desire to copy their document. If a single copy is chosen at block 516, confirmation is provided at block 520, and the user is asked to verify this at block 524. If the user does not, progress is made to block 528 where the user can specify a number of copies desired. If a single copy is not selected at block 516, progress is made directly to block 528 where the user is prompted to specify a number of copies desired which is received at block 532. Confirmation of the selected number is stated at block 536 and confirmation solicited at block 540. If not confirmed, progress returns to block 528. If confirmed, a copy is initiated at block 544. If a single copy was confirmed at block 524, progress is directly to block 544.

Next, the user is asked whether stapling is desired at block 548. This is suitably bypassed if only a single page is being copied. If stapling is selected, pages are stapled at block 552 and confirmation is stated to the user at block 556, suitably with an admonition to remove their original. If stapling was not selected at block 548, progress is directly to block 556. Once paper has been removed as determined at block 560, the system suitably returns to block 508 for a continued or new Bluetooth connection.

Figure 6:
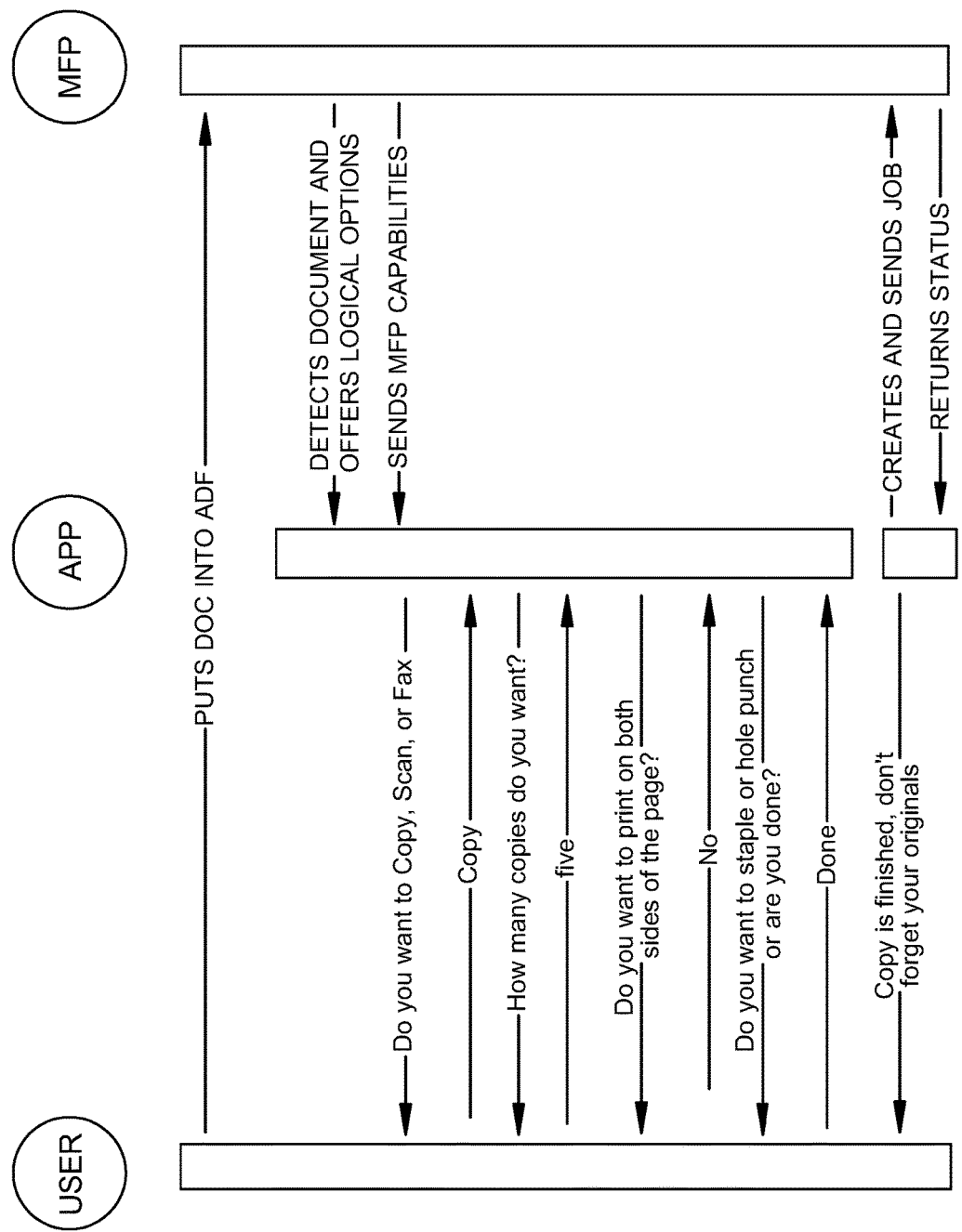
FIG. 6 is another example embodiment of a flow diagram showing device and human interaction for natural language controlled document processing operations.
Figure 7:
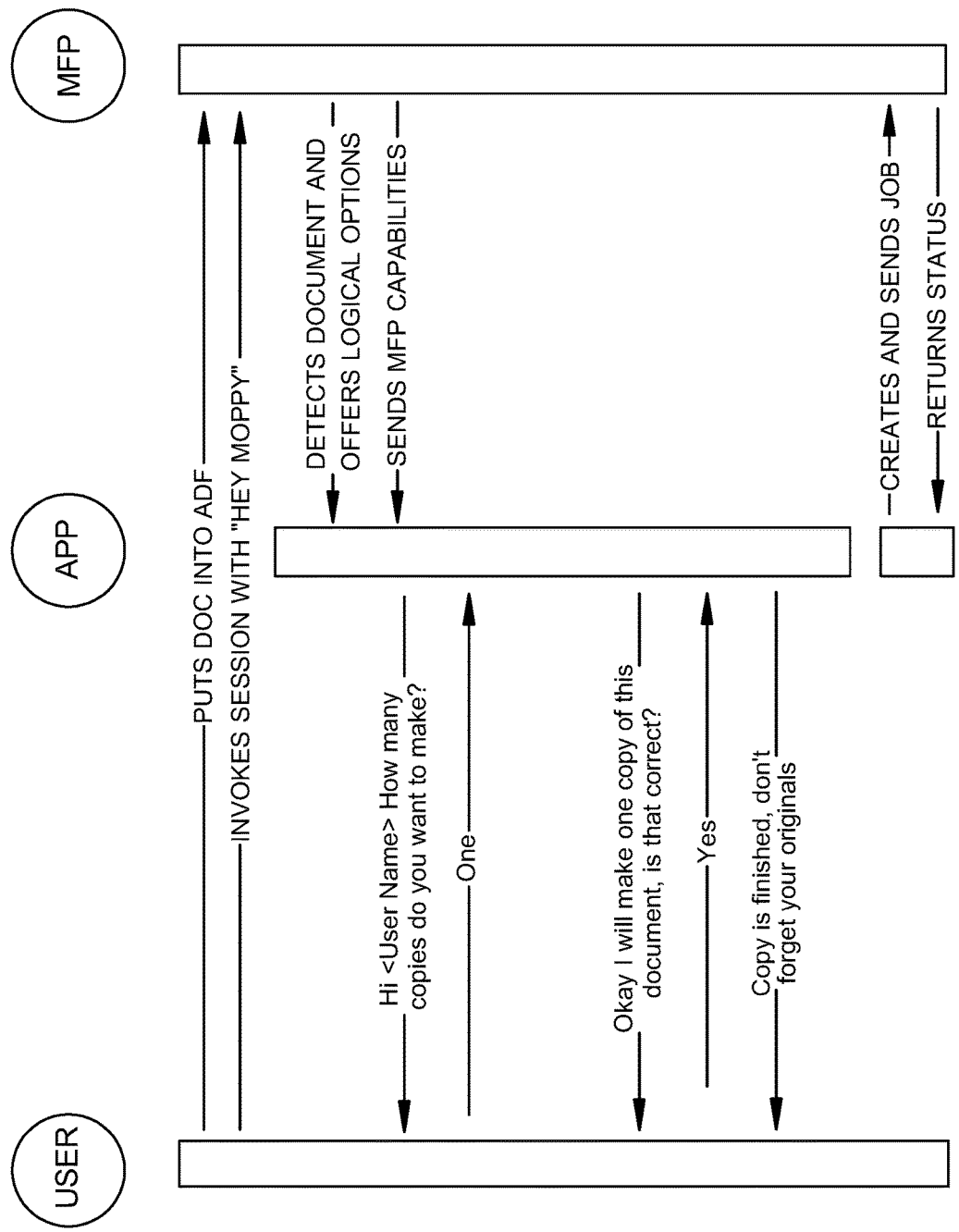
FIG. 7 is another example embodiment of a flow diagram showing device and human interaction for natural language controlled document processing operations.
Figure 8:
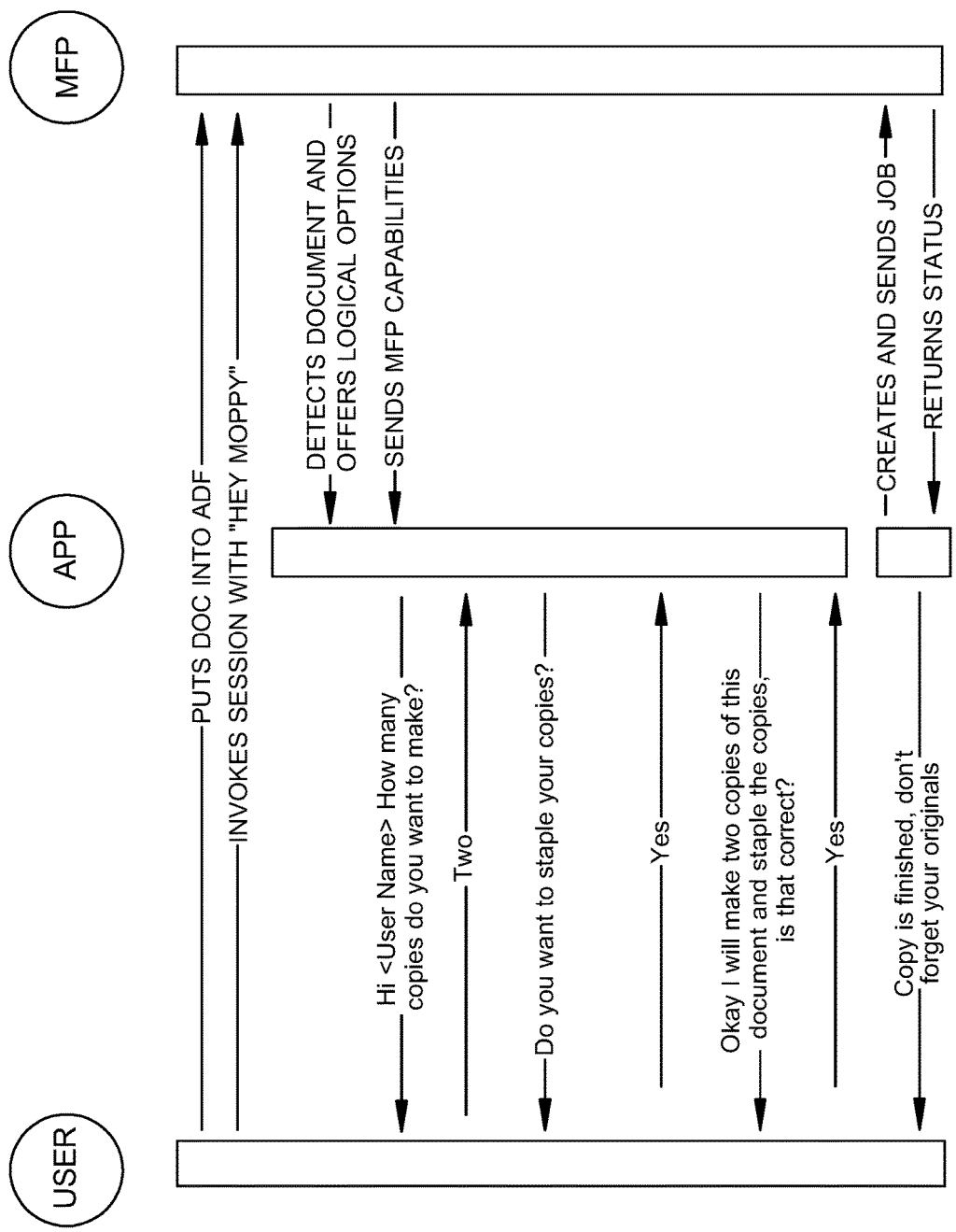
FIG. 8 is another example embodiment of a flow diagram showing device and human interaction for natural language controlled document processing operations.

FIGS. 6-8 depict flow diagrams of example embodiments of device and human interaction for natural language controlled document processing operations.

Figure 9:
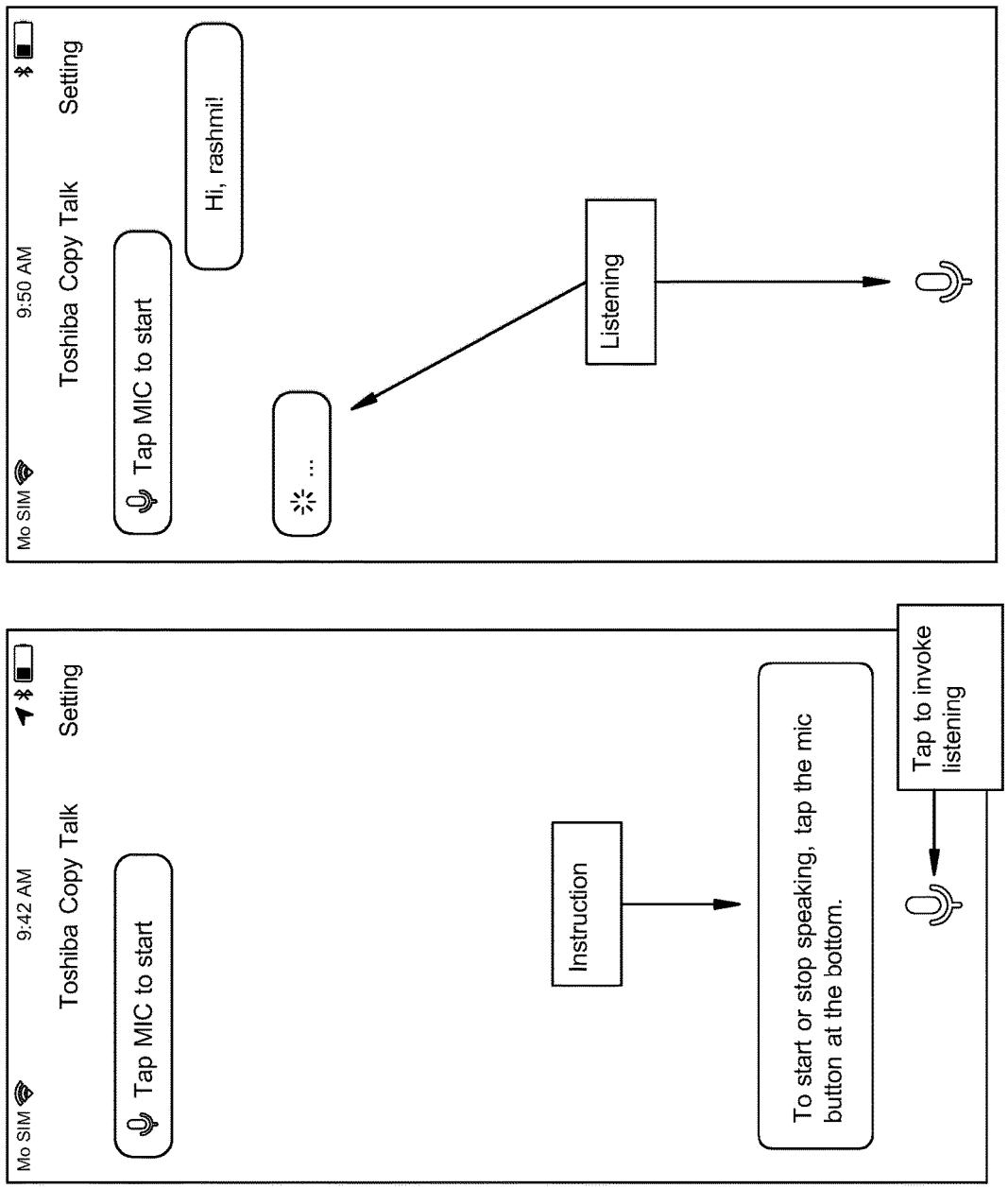
FIG. 9 is an example embodiment of example screenshots of a mobile app.

Referring also to FIG. 9, example screenshots of a mobile app are illustrated.

The home screen (left) shows instruction on how to initiate conversation.

Tapping the gray microphone invokes listening

When the client is listening, the microphone is blue and the spinny indicator is shown. This is when user should speak.

When the copy task is finished, the conversation bubbles are cleared and Home screen is shown.

When a "Stop" command is invoked, the conversation bubbles are cleared and Home screen is shown.

The use can invoke a command as follows:

By pressing the microphone button at the bottom of the screen.

By saying "Hey Moppy", or "Hey Jackie", or another suitable name. Because the system is "listening" all the time, the client may erroneously respond to ambient chatter if a common name is used.

Compound commands can contain three or more keyword commands, for example:

Please make one two-sided copy and staple it

Please make a copy that is two-sided (you will be prompted for staple)

One stapled copy please (you will be prompted for sided)

A stop command (for example, "STOP") can cancel the conversation and stop voice recognition from listening. The stop command can clear the screen and show the initial instruction to the user.

Figure 10:
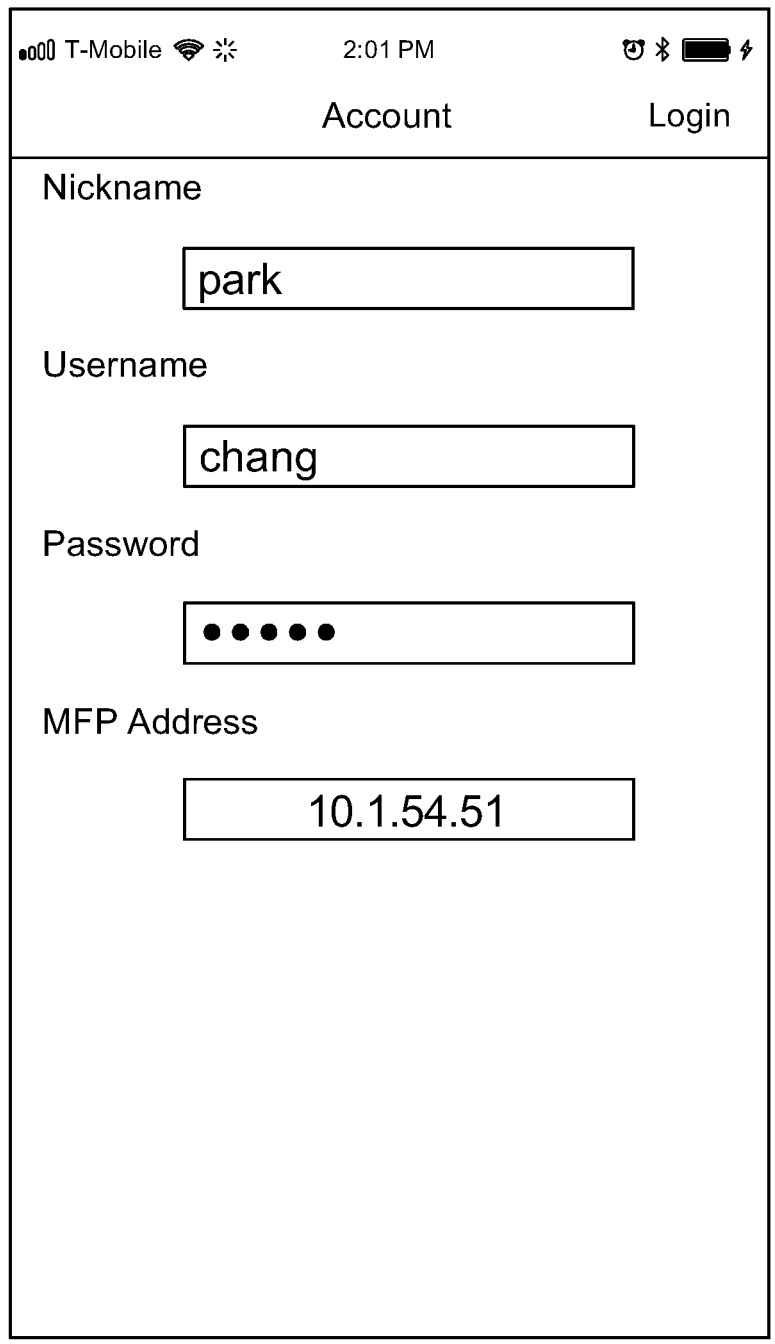
FIG. 10 is an example embodiment of name and password entry on a mobile app.

When the mobile app is first executed, a user can configured initial settings, which can be changed later by tapping the setting button. Settings may be particular to a user or particular to a user's typical for a user's document processing needs. The app suitably asks for a user name and password, for example as illustrated in FIG. 10, and enables a finger registration option. Configuration settings suitably include:

Nick Name The Name you want the Toshiba Copy Talk to call you using voice. E.g., "Rashmi". You may have to spell phonetically for example "Rashmee"

User Name to allow MFP authentication

Password to allow MFP authentication

Device IP Address—allows connectivity to MFP Toshiba Copy Talk app

English/Japanese Voice recognition and Voice Response

Touch ID—allows Toshiba Copy Talk to use Fingerprint access

Keyword: On/Off—allows Toshiba Copy Talk to listen for keywords

Timeout—allows Toshiba Copy Talk to stop listening

The system suitably identifies certain operations and invokes appropriate conversations. For example, the system can prompt the user with a staple option, but only if the job requires two or more pages.

Figure 11:
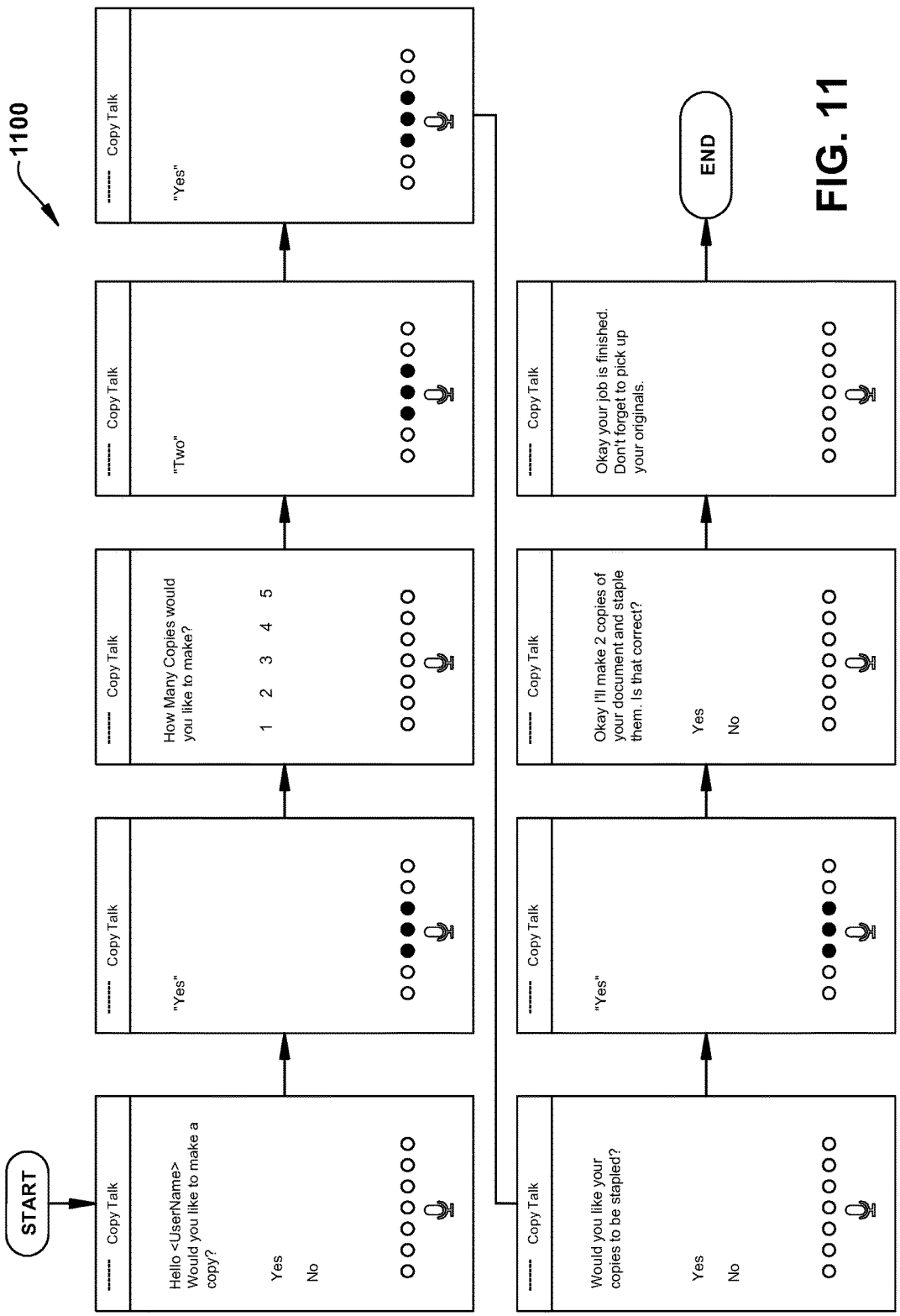
FIG. 11 is an example embodiment of a natural language dialog as reflected on a display.

FIG. 11 is a flow diagram 1100 showing natural language dialog as it is suitably reflected on a display or touchscreen of a mobile digital device, such as a tablet or smartphone.

FIGS. 12-13 illustrate example embodiments of additional device/user interaction scenarios.

FIG. 14 illustrates an example embodiment of a suitable relationship table between language key words, optional key words and multiple languages for user-device interaction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A method comprising:

sensing when a portable data device associated with a user is proximate to a multifunction peripheral;

monitoring a status of the multifunction peripheral;

storing user-specific configuration settings;

receiving activity data corresponding to performance of a preselected activity by the user;

initiating, upon receipt of activity data, a natural language exchange with the user in accordance with a monitored status of the multifunction peripheral and stored user-specific configuration settings when the portable data device is proximate to the multifunction peripheral;

receiving a document processing instruction via the natural language exchange;

generating a natural language response to the received document processing instruction;

receiving a second document processing instruction via the natural language exchange responsive to the natural language response; and performing a document processing operation in accordance with the second document processing instruction.

2. The method of claim 1 further comprising generating the activity data in accordance with a mechanical interaction between the user and the multifunction peripheral.

3. The method of claim 1 further comprising generating the activity data in accordance with a voice command received from the user.

4. The method of claim 1 further comprising receiving verbal input from the user and generating text output on a display of the portable data device to form the natural language exchange.

* * * * *